(12) United States Patent
Liang et al.

(10) Patent No.: US 11,892,424 B2
(45) Date of Patent: Feb. 6, 2024

(54) BIOLOGICAL DETECTION DEVICE, BIOLOGICAL CHIP, MICROELECTRODE STRUCTURE AND MANUFACTURING METHOD THEREOF

(71) Applicants: Beijing BOE Technology Development Co., Ltd., Beijing (CN); BOE Technology Group Co., Ltd., Beijing (CN)

(72) Inventors: Kui Liang, Beijing (CN); Shuobin Liang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/486,837

(22) Filed: Sep. 27, 2021

(65) Prior Publication Data
US 2022/0196589 A1 Jun. 23, 2022

(30) Foreign Application Priority Data

Dec. 23, 2020 (CN) .......................... 202011540582.4

(51) Int. Cl.
*G01N 27/327* (2006.01)
*H01B 3/30* (2006.01)
*H01B 17/64* (2006.01)

(52) U.S. Cl.
CPC ........... *G01N 27/327* (2013.01); *H01B 3/306* (2013.01); *H01B 17/64* (2013.01)

(58) Field of Classification Search
CPC .. G01N 27/327; G01N 27/3272; G01N 27/27; H01B 3/306; H01B 17/64
See application file for complete search history.

(56) References Cited

U.S. PATENT DOCUMENTS 5,696,314 A   12/1997  Mccaffrey et al.
6,603,998 B1 * 8/2003  King ...................... C12N 15/87
                                                                604/20
(Continued)

FOREIGN PATENT DOCUMENTS

CN    101149559 A    3/2008
CN    101172185 A    5/2008
(Continued)

OTHER PUBLICATIONS

Liu et al., Use of multi-electrode array recordings in studies of network synaptic plasticity in both time and space, Neurosci. Bull., 2012, 28(4): 409-422 (Year: 2012).*

(Continued)

*Primary Examiner* — Joshua L Allen
*Assistant Examiner* — Shizhi Qian
(74) *Attorney, Agent, or Firm* — IPro, PLLC

(57) ABSTRACT

The present disclosure provides a biological detection device, a biological chip, a microelectrode structure, and a manufacturing method of the microelectrode structure. The microelectrode structure can include a first insulating layer, a protrusion, and an electrode layer. The protrusion is disposed on the first insulating layer. The electrode layer conformally covers the first insulating layer and the protrusion. The present disclosure can improve the detection accuracy.

16 Claims, 7 Drawing Sheets

(56) References Cited

U.S. PATENT DOCUMENTS

| | | | | |
|---|---|---|---|---|
| 6,811,663 | B1* | 11/2004 | Freeman | G01N 27/307 |
| | | | | 204/600 |
| 2002/0133129 | A1 | 9/2002 | Arias et al. | |
| 2004/0074785 | A1 | 4/2004 | Holker et al. | |
| 2004/0106166 | A1 | 6/2004 | Matsumoto | |
| 2015/0038809 | A1 | 2/2015 | Etzkorn et al. | |
| 2016/0022187 | A1* | 1/2016 | Pushpala | A61B 5/150969 |
| | | | | 600/347 |
| 2018/0325430 | A1 | 11/2018 | Vaddiraju et al. | |
| 2020/0072825 | A1 | 3/2020 | Hosseini et al. | |
| 2020/0087810 | A1* | 3/2020 | Hosseini | G01N 27/30 |
| 2020/0230401 | A1 | 7/2020 | Vachicouras et al. | |
| 2022/0080193 | A1* | 3/2022 | Demiryurek | A61N 1/0502 |

FOREIGN PATENT DOCUMENTS

| | | | | |
|---|---|---|---|---|
| CN | 101398614 | A | | 4/2009 |
| CN | 103613912 | A | | 3/2014 |
| CN | 105051590 | A | | 11/2015 |
| CN | 106054519 | A | | 10/2016 |
| CN | 108732217 | A | | 11/2018 |
| CN | 108975266 | A | * 12/2018 | A61B 5/0408 |
| CN | 110073038 | A | | 7/2019 |
| CN | 110140043 | A | | 8/2019 |
| CN | 110678122 | A | | 1/2020 |
| CN | 111450409 | A | | 7/2020 |
| DE | 3930768 | A1 | | 3/1991 |

OTHER PUBLICATIONS

Bai et al., English translation of CN-108975266-A, (Year: 2018).*
Cheng et al., Recent progress of micro-needle formulations: fabrication strategies and delivery applications, Journal of drug delivery science and technology, 50(2019) 18-26 (Year: 2019).*
Wang et al., Latest research progress of microneedle processing technology, Micronanoelectronic Technology, 57(11), 918-930, 2020 (Year: 2020).*
Huang et al., A wireless flexible wearable biopotential acquisition system utilizing parylene based microneedle array, Transducers 2019—Eurosensors XXXIII, Berlin, Germany, Jun. 23-27, 2019 (Year: 2019).*
Lee et al., A cobalt-coated needle-type microelectrode array sensor for in situ monitoring of phosphate, J. Micromech. Microeng., 19 (2009) 025022. (Year: 2009).*
Hungar, Kaspar, et al. "Production processes for a flexible retina implant (Eurosensors XVIII, Session C6. 6)." Sensors and Actuators A: Physical 123 (2005): 172-178.
CN2020115405824 first office action.
Rui yuefeng et al. "Research on Spherical Raised Microelectrode Arrays Based on Parylene." National Natural Science Foundation of China. pp. 196-200. Oct. 22, 2019.

* cited by examiner

BIOLOGICAL DETECTION DEVICE, BIOLOGICAL CHIP, MICROELECTRODE STRUCTURE AND MANUFACTURING METHOD THEREOF

CROSS-REFERENCES TO RELATED APPLICATIONS

This patent application claims the priority of the Chinese patent application No. 202011540582.4 filed on Dec. 23, 2020, and entitled "BIOLOGICAL DETECTION DEVICE, BIOLOGICAL CHIP, MICROELECTRODE STRUCTURE AND MANUFACTURING METHOD THEREOF", the entire content of which is incorporated herein by reference.

TECHNICAL FIELD

The present disclosure relate to the technical field of sensor technology, in particular to a biological detection device, a biological chip, a microelectrode structure and a manufacturing method thereof.

BACKGROUND

An electrochemical biological detection device refers to a detection device that uses an electrode as a signal conversion element and a voltage or a current as a detection signal. Due to the advantages of high sensitivity, easy operation, and low cost, biological detection devices have been widely used in clinical testing, environmental analysis, food safety, drug analysis and other fields in recent years. However, the detection accuracy of the existing biological detection device is rather low.

SUMMARY

The objective of the present disclosure is to provide a biological detection device, a biological chip, a microelectrode structure, and a manufacturing method of a microelectrode structure, which can improve detection accuracy.

According to a first aspect of the embodiments of the present disclosure, a microelectrode structure is provided, including:
 a first insulating layer;
 a protrusion disposed on the first insulating layer; and
 an electrode layer conformally covering the first insulating layer and the protrusion.
 In addition, the microelectrode structure further includes:
 a second insulating layer disposed on a side of the electrode layer facing away from the first insulating layer, wherein the second insulating layer is provided with an opening, and the protrusion extends out through the opening.
 In addition, a side surface of the protrusion and a bottom surface of the protrusion form an acute angle.
 In addition, the protrusion and the first insulating layer are an integral structure.
 In addition, the electrode layer includes one or more electrode regions, and a plurality of the electrode regions are separated from each other, and surfaces of the first insulating layer correspond to the electrode regions are provided with a plurality of the protrusions.
 In addition, the microelectrode structure further includes:
 a first sensitive functional layer covering at least an area of the electrode layer corresponding to the protrusion;
 an auxiliary layer at least covering an area of the first sensitive functional layer corresponding to the protrusion, and provided with a first through hole exposing the first sensitive functional layer, wherein a distance between the auxiliary layer and the electrode layer is less than or equal to 100 μm; and
 a second sensitive functional layer covering the auxiliary layer and filling the first through hole so as to be in contact with the first sensitive functional layer,
 wherein the protrusion has a tapered structure, and the first through hole is provided in an area of the auxiliary layer corresponding to the top of the protrusion.
 In addition, the first insulating layer is provided with a second through hole exposing the electrode layer, and
 a bump is formed on a side of the first insulating layer, wherein the protrusion is disposed on the bump.

According to a second aspect of the embodiments of the present disclosure, a manufacturing method of a microelectrode structure is provided, includes:
 forming a first insulating layer on a supporting plate;
 forming a protrusion on a side of the first insulating layer away from the supporting plate;
 forming an electrode layer that conformally covers the first insulating layer and the protrusion; and
 removing the supporting plate.
 In addition, before removing the supporting plate, the manufacturing method of the microelectrode structure further includes:
 forming a second insulating layer on a side of the electrode layer facing away from the first insulating layer, wherein the second insulating layer is provided with an opening, and the protrusion extends out through the opening.
 In addition, before removing the supporting plate, the manufacturing method of the microelectrode structure further includes:
 forming a first sensitive functional layer, the first sensitive functional layer covering at least an area of the electrode layer corresponding to the protrusion;
 forming an auxiliary layer that covers at least an area of the first sensitive functional layer corresponding to the protrusion, and provided with a first through hole exposing the first sensitive functional layer, wherein a distance between the auxiliary layer and the electrode layers is less than or equal to 100 μm.
 In addition, after forming the auxiliary layer, the manufacturing method of the microelectrode structure further includes:
 forming a second sensitive functional layer, the second sensitive functional layer covering the auxiliary layer and filling the first through hole so as to be in contact with the first sensitive functional layer.

According to a third aspect of the embodiments of the present disclosure, a manufacturing method of a microelectrode structure is provided, including:
 providing a template, one surface of the template having a recess;
 forming an electrode layer on a side of the template having the recess, the electrode layer conformally covering the recess;
 forming a first insulating layer on a side of the electrode layer facing away from the template, and forming a protrusion in an area of the first insulating layer corresponding to the recess; and
 removing the template.
 In addition, forming an electrode layer on a side of the template having a recess includes:

forming a second insulating layer on a side of the template having a recess, the second insulating layer having an opening, and the recess being exposed through the opening; and forming an electrode layer covering the second insulating layer and the recess.

In addition, after removing the template, the manufacturing method of the microelectrode structure further includes:

forming a second insulating layer on a side of the electrode layer facing away from the first insulating layer, wherein the second insulating layer is provided with an opening, and the protrusion extends out through the opening.

In addition, forming an electrode layer on a side of the template having a recess includes:

forming a sacrifice layer on a side of the template having a recess, the sacrifice layer conformally covering the recess; and forming an electrode layer on a side of the sacrifice layer facing away from the template, the electrode layer conformally covering an area where the sacrifice layer is disposed in the recess; and removing the template includes:

removing the sacrifice layer and the template.

In addition, removing the sacrifice layer includes:

removing the sacrifice layer by an etching solution, and an etching rate of an etching solution to the sacrifice layer is larger than an etching rate of an etching solution to the electrode layer.

In addition, the manufacturing method of a microelectrode structure further includes:

forming a first sensitive functional layer, the first sensitive functional layer covering at least an area of the electrode layer corresponding to the protrusion;

forming an auxiliary layer that covers at least an area of the first sensitive functional layer corresponding to the protrusion and is provided with a first through hole exposing the first sensitive functional layer, wherein a distance between the auxiliary layer and the electrode layers is less than or equal to 100 μm.

In addition, after forming the auxiliary layer, the manufacturing method of the microelectrode structure further includes:

forming a second sensitive functional layer, the second sensitive functional layer covering the auxiliary layer and filling the first through hole so as to be in contact with the first sensitive functional layer.

According to a fourth aspect of the embodiments of the present disclosure, a biological chip is provided, including the microelectrode structure described above.

According to a fifth aspect of the embodiments of the present disclosure, a biological detection device is provided, including the biological chip described above.

In the biological detection device, the biochip, the microelectrode structure and the manufacturing method of the microelectrode structure of the present disclosure, the protrusion is disposed on the first insulating layer, and the electrode layer conformally covers the first insulating layer and the protrusion, so that an area of the electrode layer corresponding to the protrusion also protrudes outwards, which can increase the area of the electrode layer disposed on the first insulating layer, increasing the contact area between the electrode layer and an object under detection, and thereby improving the detection accuracy.

DETAILED DESCRIPTION OF THE EMBODIMENTS

Figure 1:
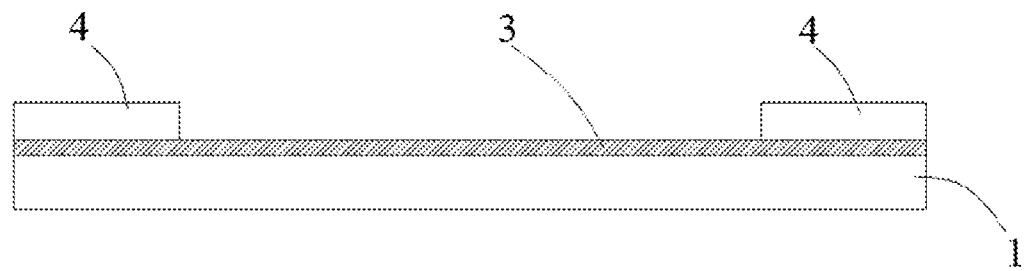
FIG. 1 is a schematic diagram of a microelectrode structure in the related art.

Embodiments will be described in detail herein, with the illustrations thereof represented in the drawings. When the following descriptions involve the drawings, like numerals in different drawings refer to like or similar elements unless otherwise indicated. The implements described in the following embodiments do not represent all implements consistent with the present disclosure. Rather, they are merely examples of apparatuses and methods consistent with some aspects of the present disclosure as detailed in the appended claims.

The terms used in the present disclosure are only for the purpose of describing specific embodiments, and are not intended to limit the present disclosure. Unless otherwise defined, the technical terms or scientific terms used in the present disclosure shall have the usual meanings understood by those with ordinary skills in the field to which this disclosure belongs. The "first", "second" and similar words used in the specification and claims of the present disclosure do not denote any order, quantity or importance, but are only used to distinguish different components. Similarly, similar words such as "one" or "a" do not mean a quantity limit, but mean that there is at least one. "Multiple" or "several"

means two or more. Unless otherwise indicated, similar words such as "front", "rear", "lower" and/or "upper" are only for convenience of description, and are not limited to one position or one spatial orientation. "Comprising or "including" and other similar words mean that the elements or items before "comprising" or "including" now cover the elements or items listed after "comprising" or "including" and their equivalents, and do not exclude other elements or objects. Similar words such as "connected" or "connecting" are not limited to physical or mechanical connections, and can include electrical connections, whether direct or indirect. The singular forms of "a", "said" and "the" used in the specification of the present disclosure and the appended claims are also intended to include plural forms, unless the context clearly indicates other meanings. It should also be understood that the term "and/or" as used herein refers to and includes any or all possible combinations of one or more associated listed items.

In the related art, as shown in FIG. 1, a microelectrode structure includes a first insulating layer 1, a second insulating layer 4, and an electrode layer 3 disposed between the first insulating layer 1 and the second insulating layer 4. The second insulating layer 4 is provided with a window exposing the electrode layer 3, wherein since the electrode layer 3 is disposed in the window, the electrode layer 3 cannot be in close contact with the biological tissue, thereby affecting the detection accuracy.

Figure 2:
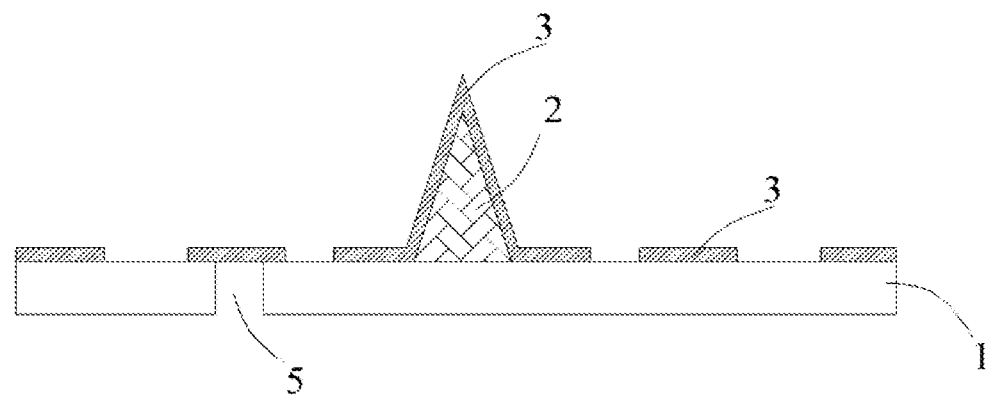
FIG. 2 is a schematic diagram of a microelectrode structure according to an implementation of the present disclosure.

An embodiment of the present disclosure provides a microelectrode structure. As shown in FIG. 2, the microelectrode structure can include a first insulating layer 1, a protrusion 2 and an electrode layer 3.

The protrusion 2 is disposed on the first insulating layer 1. The electrode layer 3 conformally covers the first insulating layer 1 and the protrusion 2.

In the electrode structure of the implementation of the present disclosure, the protrusion 2 is disposed on the first insulating layer 1, and the electrode layer 3 conformally covers the first insulating layer 1 and the protrusion 2, so that an area of the electrode layer 3 corresponding to the protrusion 2 also protrudes outwards, which can increase the area of the electrode layer 3 disposed on the first insulating layer 1, increasing the contact area between the electrode layer 3 and an object under detection, and thereby improving the detection accuracy.

Hereinafter, each part of the microelectrode structure of the implementation of the present disclosure will be described in detail.

Figure 13:
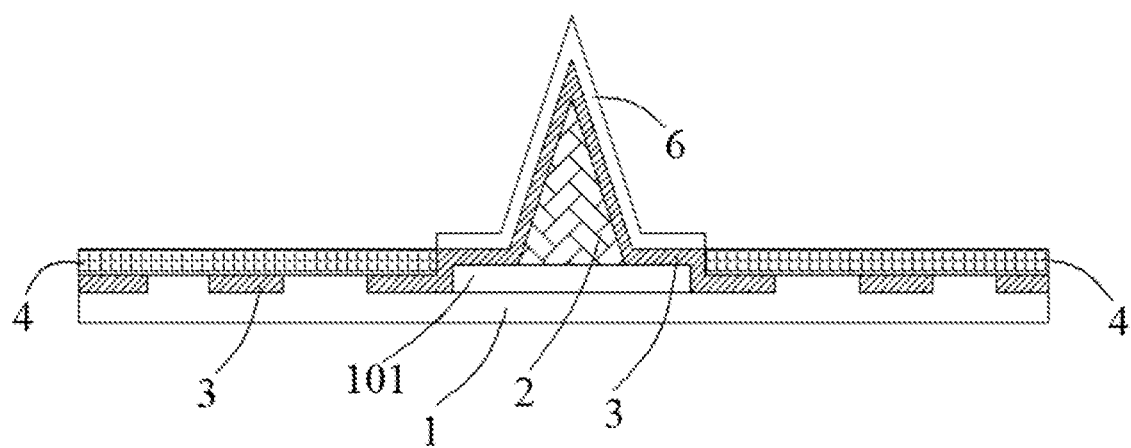
FIG. 13 is another schematic diagram after forming a first sensitive functional layer in the manufacturing method of the microelectrode structure according to an implementation of the present disclosure.

As shown in FIG. 2, the material of the first insulating layer 1 can be an organic material, such as a polymer material, so that the microelectrode structure has good flexibility and ensures good contact between the microelectrode structure and a biological tissue, and also reducing implant damage. The polymer material can be polyimide, parylene, polydimethylsiloxane, and the like. In other implementations of the present disclosure, the material of the first insulating layer 1 can also be an inorganic material, such as a silicon-based material, so that the microelectrode structure has better biocompatibility and has an advantage of being compatible with microelectronic processing technology of CMOS. The first insulating layer 1 can include first and second surfaces which are opposite to each other. In addition, as shown in FIG. 13, a bump 101 can be formed on a side of the first insulating layer 1. The bump 101 can be a part of the first insulating layer 1.

As shown in FIG. 2, the protrusion 2 can be disposed on the first insulating layer 1. The protrusion 2 can be disposed on a first surface of the first insulating layer 1. The protrusion 2 can include a bottom surface and a side surface connected to each other. The bottom surface of the protrusion 2 faces the first surface of the first insulating layer 1 and is matched with the first surface of the first insulating layer 1. The side surface of the protrusion 2 and the bottom surface of the protrusion 2 form an acute angle, that is, a cross section area of the protrusion 2 gradually decreases in a direction away from the first insulating layer 1. Further, the protrusion 2 can have a conical structure, such as a cone. In other implementations of the present disclosure, the protrusion 2 can be a cylindrical structure, a prismatic structure, a truncated cone structure, or the like. The maximum width of the protrusion 2 in a direction parallel to the first insulating layer 1 can be less than or equal to 10 μm. Taking the first protrusion 2 as a cone as an example, the bottom surface of the cone has a diameter less than or equal to 10 μm. Since the maximum width of the protrusion 2 in the direction parallel to the first insulating layer 1 is small, more protrusions 2 can be formed in a unit area of the first insulating layer 1. In other implementations of the present disclosure, the maximum width of the protrusion 2 in a direction parallel to the first insulating layer 1 can be greater than 10 μm and less than 100 μm. The height of the protrusion 2 can be less than or equal to 10 μm. However, the height of the protrusion 2 can also be greater than 10 μm. The material of the protrusion 2 can be an insulating material, such as an inorganic insulating material, an organic insulating material, and the like. The organic insulating material can be polyimide, parylene, polydimethylsiloxane, or the like. The material of the protrusion 2 can be the same as the material of the first insulating layer 1. Further, the protrusion 2 and the first insulating layer 1 are an integral structure, that is, the protrusion 2 and the first insulating layer 1 are integrally formed. In addition, the number of the protrusions 2 can be multiple, and the plurality of protrusions 2 are arranged at intervals. In addition, as shown in FIG. 13, the protrusion 2 is disposed on the bump 101. The protrusion 2 is disposed within the boundary of the bump 101, that is, the lateral dimension of the protrusion 2 is smaller than the lateral dimension of the bump 101.

As shown in FIG. 2, the electrode layer 3 conformally covers the first insulating layer 1 and the protrusion 2, that is, the area of the electrode layer 3 corresponding to the protrusion 2 protrudes toward a direction away from the protrusion 2. In the present disclosure, the thickness of the electrode layer 3 can be sized such that the electrode layer 3 conformally covers the first insulating layer 1 and the protrusion 2. Since the side surface of the protrusion 2 and the bottom surface of the protrusion 2 form an acute angle, the electrode layer 3 covering the protrusion 2 cannot be easily broken. The material of the electrode layer 3 can be a metal material, such as Au, Ag, Pd, Pt, etc. In another implementation of the present disclosure, the material of the electrode layer 3 can include a conductive polymer, such as PEDOT:PSS, PEDOT:PEGDA, etc. However, the PEDOT is poly(3,4-ethylenedioxythiophene), the PSS is poly(styrene sulfonate), and the PEGDA is poly(ethylene glycol) diacrylate. PEDOT: PSS means a blend of PEDOT and PSS. PEDOT: PEGDA means a blend of PEDOT and PEGDA. In addition, the first insulating layer 1 can also be provided with a second through hole 5 exposing the electrode layer 3 so that an external circuit is electrically connected to the electrode layer 3 through the second through hole 5.

Figure 3:
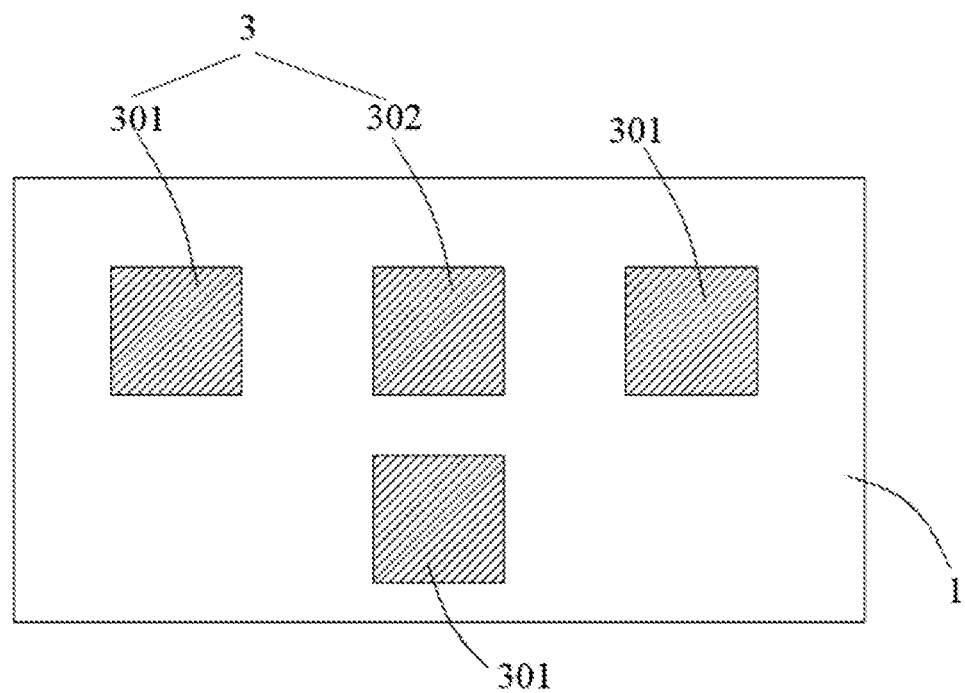
FIG. 3 is a schematic plan view of a microelectrode structure according to an implementation of the present disclosure.

As shown in FIG. 3, the electrode layer 3 can include one or more electrode regions. Taking the electrode layer 3 including a plurality of electrode regions as an example, the plurality of electrode regions are separated from each other.

The distance between two adjacent electrode regions can be 0.5 cm-2 cm, such as 0.5 cm, 0.8 cm, 1.3 cm, 1.5 cm, 2 cm, and so on. In an implementation of the present disclosure, the electrode layer 3 is a double-electrode system, that is, the plurality of electrode regions can include one reference electrode region 302 and one or more working electrode regions 301. In another implementation of the present disclosure, the electrode layer 3 is a three-electrode system, that is, the plurality of electrode regions can include one reference electrode region 302, one counter electrode region, and one or more working electrode regions 301. The first insulating layer 1 is provided with a plurality of protrusions 2 on the surface corresponding to each electrode region.

Figure 4:
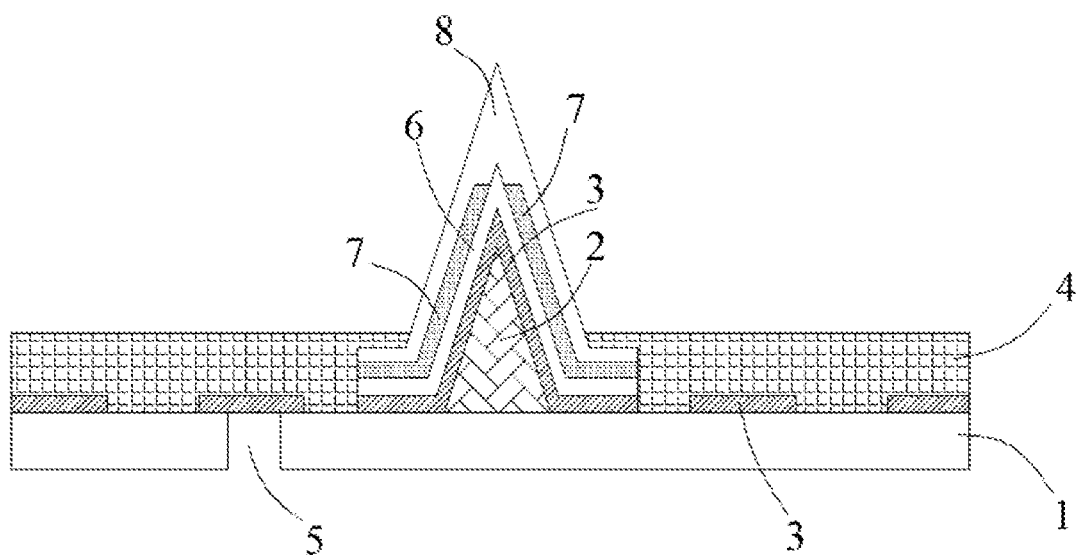
FIG. 4 is another schematic diagram of a microelectrode structure according to an implementation of the present disclosure.

As shown in FIG. 4, the microelectrode structure of the implementation of the present disclosure can further include a second insulating layer 4. The second insulating layer 4 can be disposed on a side of the electrode layer 3 facing away from the first insulating layer 1. The second insulating layer 4 can be provided with an opening, and the protrusion 2 extends out through the opening of the second insulating layer 4, so that the protrusion 2 can be in close contact with a biological tissue, improving the detection efficiency and detection accuracy. Taking a plurality of protrusions 2 as an example, the number of openings can also be multiple, and the plurality of protrusions 2 extend out of the plurality of openings in a one-to-one correspondence. In other implementations of the present disclosure, each electrode region described above corresponds to one opening, that is, a plurality of protrusions 2 corresponding to each electrode region are exposed through one opening. The material of the second insulating layer 4 can be an organic material, such as a polymer material. The polymer material can be polyimide, parylene, polydimethylsiloxane, and the like. In other implementations of the present disclosure, the material of the second insulating layer 4 can also be an inorganic material, such as a silicon-based material. The material of the second insulating layer 4 can be the same as the material of the first insulating layer 1, however, the materials thereof can also be different.

Figure 5:
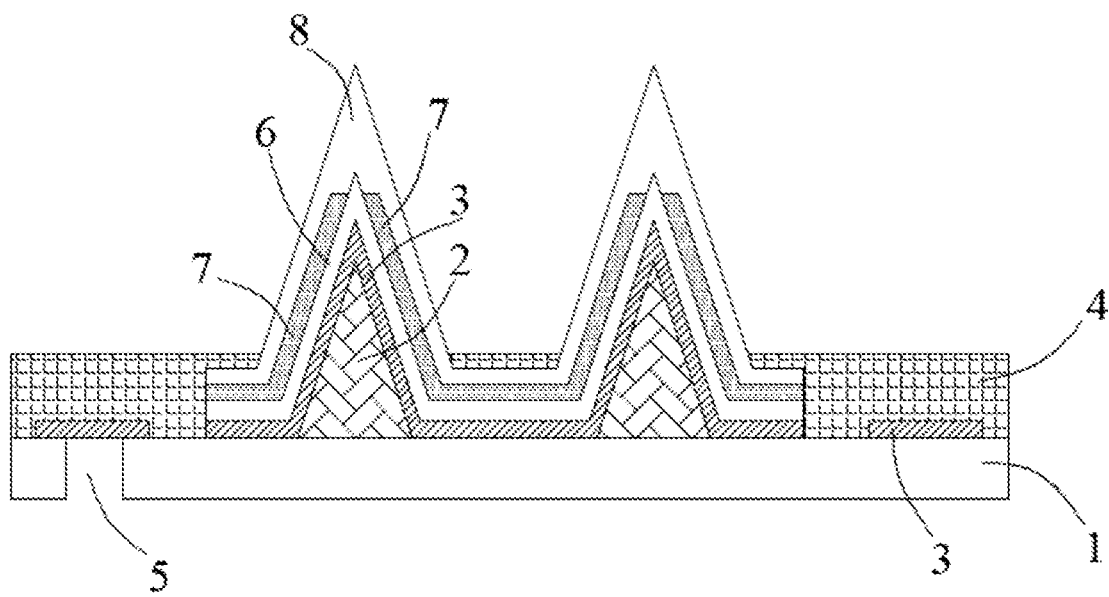
FIG. 5 is another schematic diagram of a microelectrode structure according to an implementation of the present disclosure.

As shown in FIG. 4, the microelectrode structure of the implementation of the present disclosure can further include a first sensitive functional layer 6. In an implementation of the present disclosure, the first sensitive functional layer 6 can include an ionophore or the like, so that the electrode layer 3 forms an ion selective electrode, so that the microelectrode structure can be used to measure ions. For example, the first sensitive functional layer 6 can be a sodium ion sensitive functional layer, a potassium ion sensitive functional layer, a calcium ion sensitive functional layer, a hydrogen ion sensitive functional layer or a chloride ion sensitive functional layer, so that the microelectrode structure can be used to measure sodium ion, potassium ion, calcium ion, hydrogen ion, chloride ion, etc. In another implementation of the present disclosure, the first sensitive functional layer 6 can include an enzyme, such as glucase, so that the microelectrode structure can be used to analyze glucose. However, the first sensitive functional layer 6 can also be used to analyze lactic acid or the like. The first sensitive functional layer 6 covers at least the area of the electrode layer 3 corresponding to the protrusion 2. Further, taking the microelectrode structure including the second insulating layer 4 as an example, the first sensitive functional layer 6 covers at least the area of the electrode layer 3 corresponding to the portion of the protrusion 2 extending out of the opening. The microelectrode structure of the implementation of the present disclosure can further include an auxiliary layer 7. The auxiliary layer 7 covers at least the area of the first sensitive functional layer 6 corresponding to the protrusion 2. The auxiliary layer 7 is provided with a first through hole exposing the first sensitive functional layer 6. The first through hole is disposed outside the opening, that is, the part of the first sensitive functional layer 6 outside the opening is exposed through the first through hole. The distance between the auxiliary layer 7 and the electrode layer 3 is less than or equal to 100 μm, so that a capillary channel is formed between the auxiliary layer 7 and the electrode layer 3 to generate capillary force and further improve the extraction and adsorption capacity of the microelectrode structure to the biological tissue fluids, sweat and other liquids. The distance between the auxiliary layer 7 and the electrode layer 3 can be less than or equal to 10 μm, for example, 10 μm, 9 μm, 7 μm, 6 μm, 5 μm, and so on. In addition, taking the above-mentioned protrusion 2 having a tapered structure as an example, the first through hole can be provided in an area of the auxiliary layer 7 corresponding to the top end of the protrusion 2. The material of the auxiliary layer 7 can be an inorganic material, such as a metal material. However, the material of the auxiliary layer 7 can also be an organic material. The material of the auxiliary layer 7 can be the same as the material of the electrode layer 3. The microelectrode structure of the implementation of the present disclosure can further include a second sensitive functional layer 8. The second sensitive functional layer 8 can cover the auxiliary layer 7 and fill the first through hole to contact the first sensitive functional layer 6. With the second sensitive functional layer 8, the extraction and adsorption capacity of the microelectrode structure can be further improved. The second sensitive functional layer 8 has the same composition as the first sensitive functional layer 6. In addition, when there are a plurality of protrusions 2 on the first insulating layer 1, the formed microelectrode structure is as shown in FIG. 5.

An embodiment of the present disclosure also provides a biochip. The biochip can include the microelectrode structure described in any of the above implementations. Since the microelectrode structure included in the biochip is the same as the microelectrode structure in the above implementations of the microelectrode structure, it has the same beneficial effects, which will not be repeated in this disclosure.

An embodiment of the present disclosure also provides a biological detection device. The biological detection device can be a biological sensor or the like. The biological detection device can include the biological chip described in any of the above implementations. Since the biochip included in the biological detection device is the same as the biochip in the above-mentioned implementation of the biochip, it has the same beneficial effects, which will not be repeated in this disclosure.

Figure 6:
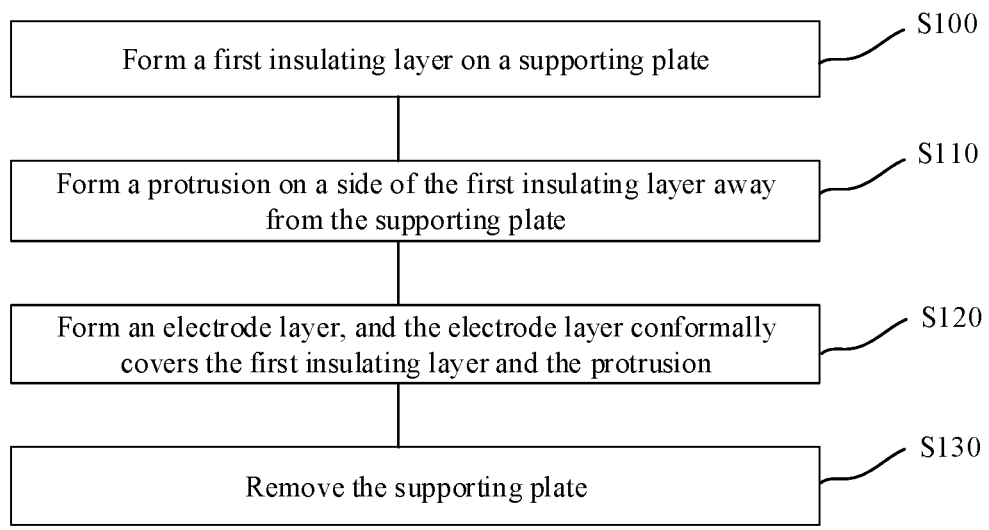
FIG. 6 is a flowchart of a manufacturing method of a microelectrode structure according to an implementation of the present disclosure.

An embodiment of the present disclosure also provides a manufacturing method of the microelectrode structure, which is used to manufacture the above-mentioned microelectrode structure. As shown in FIG. 6, the manufacturing method of the microelectrode structure can include steps S100-S130.

In step S100, a first insulating layer is formed on a supporting plate.

In step S110, a protrusion is formed on a side of the first insulating layer away from the supporting plate.

In step S120, an electrode layer is formed, and the electrode layer conformally covers the first insulating layer and the protrusion.

In step S130, the supporting plate is removed.

The microelectrode structure produced by the manufacturing method of the microelectrode structure in the embodiment of the present disclosure is the same as the microelectrode structure in the above implementations of the microelectrode structure, and therefore, it has the same beneficial effects, which will not be repeated in this disclosure.

The steps of the manufacturing method of the microelectrode structure of the embodiment of the present disclosure will be described in detail below.

In step S100, a first insulating layer is formed on a supporting plate.

Figure 7:
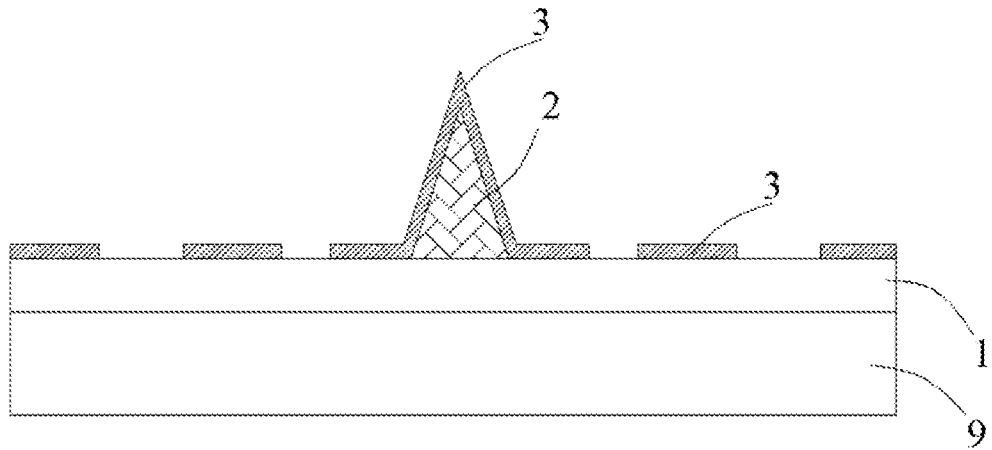
FIG. 7 is a schematic diagram after forming an electrode layer in the manufacturing method of the microelectrode structure according to an implementation of the present disclosure.

As shown in FIG. 7, the material of the supporting plate 9 can be inorganic oxide, plastic, or the like. The first insulating layer 1 can be produced by liquid deposition, for example, a spin coating process, but the present disclosure does not specifically limit this.

In step S110, a protrusion is formed on a side of the first insulating layer away from the supporting plate.

As shown in FIG. 7, the present disclosure can form the protrusion 2 on a side of the first insulating layer 1 away from the supporting plate 9 through an imprinting process or a transfer process. Since the protrusion 2 is produced by an imprinting process or a transfer process, the protrusion 2 having a larger size can be produced. For example, the height of the protrusion 2 can be between 10 μm and 100 μm.

In step S120, an electrode layer is formed, and the electrode layer conformally covers the first insulating layer and the protrusion.

As shown in FIG. 7, taking the material of the electrode layer 3 as a metal material and the electrode layer 3 includes a plurality of electrode regions spaced apart from each other as an example. Forming the electrode layer 3 can include: forming an electrode material layer, which covers conformally the first insulating layer 1 and the protrusion 2; and patterning the electrode material layer to form the electrode layer 3. The electrode material layer can be produced by an evaporation process. In the present disclosure, the electrode material layer can be patterned through a photolithography process to form the electrode layer 3 including a plurality of electrode regions. Taking the material of the electrode layer 3 being a conductive polymer as an example, the electrode layer 3 including a plurality of electrode regions can be formed by inkjet printing in the present disclosure, but the present disclosure does not specifically limit this.

In step S130, the supporting plate is removed.

Figure 8:
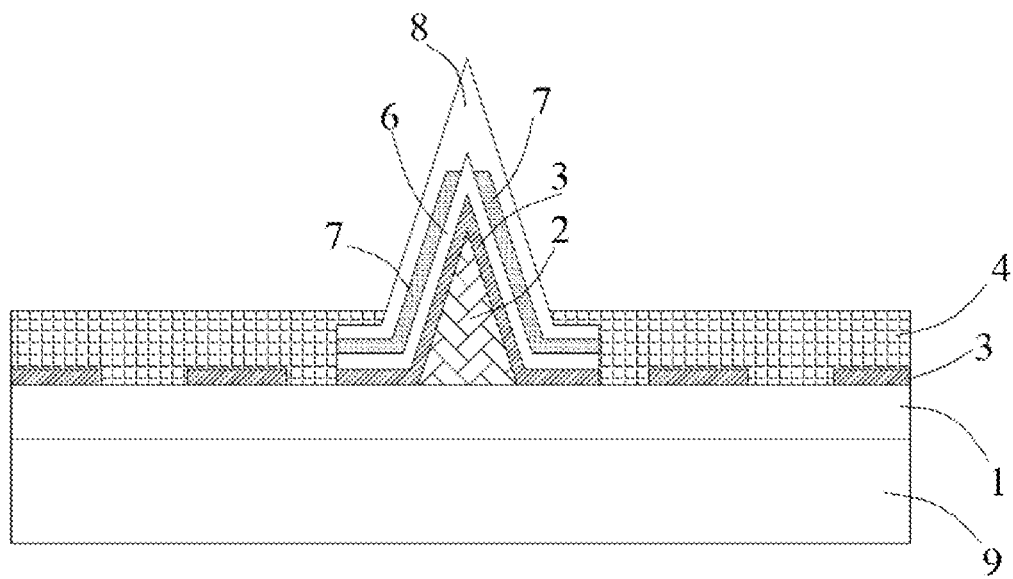
FIG. 8 is a schematic diagram after a second sensitive functional layer is formed in the manufacturing method of the microelectrode structure according to an implementation of the present disclosure.

In the present disclosure, the supporting plate 9 can be removed by a chemical corrosion peeling process, but the present disclosure does not specifically limit this. Before the supporting plate 9 is removed, as shown in FIG. 8, the manufacturing method of the microelectrode structure of the present disclosure can further include: forming a second insulating layer 4 on a side of the electrode layer 3 facing away from the first insulating layer 1. The layer 4 is provided with an opening, and the protrusion 2 protrudes from the opening. Specifically, forming the second insulating layer 4 can include: forming an insulating material layer on a side of the electrode layer 3 facing away from the first insulating layer 1; patterning the insulating layer material layer to form the second insulating layer 4, where the layer 4 is provided with an opening, and the protrusion 2 protrudes from the opening. The insulating material layer can be produced by liquid deposition, such as a spin coating process, but the present disclosure does not specifically limit this. In the present disclosure, the insulating layer material layer can be patterned through a photolithography process.

Before removing the supporting plate 9. As shown in FIG. 8, the manufacturing method of the microelectrode structure of the present disclosure can further include: forming a first sensitive functional layer 6, the first sensitive functional layer 6 covering at least an area of the electrode layer 3 corresponding to the protrusion 2. The first sensitive functional layer 6 can be produced by a spin coating process. After forming the first sensitive functional layer 6, the manufacturing method of the microelectrode structure of the present disclosure can further include: forming an auxiliary layer 7, which covers at least an area of the first sensitive functional layer 6 corresponding to the protrusion 2, and forming a first through hole for exposing the first sensitive functional layer 6, where a distance between the auxiliary layer 7 and the electrode layer 3 is less than or equal to 100 μm. Taking the material of the auxiliary layer 7 being a metal material as an example, the auxiliary layer 7 can be produced by an evaporation process. After the auxiliary layer 7 is formed, the manufacturing method of the microelectrode structure of the present disclosure can further include: forming a second sensitive functional layer 8, the second sensitive functional layer 8 covering the auxiliary layer 7 and filling the first through hole to be in contact with the first sensitive functional layer 6. The second sensitive functional layer 8 can be produced by a spin coating process. In addition, the first through hole on the auxiliary layer 7 is disposed outside the opening of the second insulating layer 4.

The manufacturing method of the microelectrode structure and the microelectrode structure in the implementations of the present disclosure belong to the same inventive concept, and the descriptions of related details and beneficial effects can be referred to each other, which will not be repeated.

Figure 9:
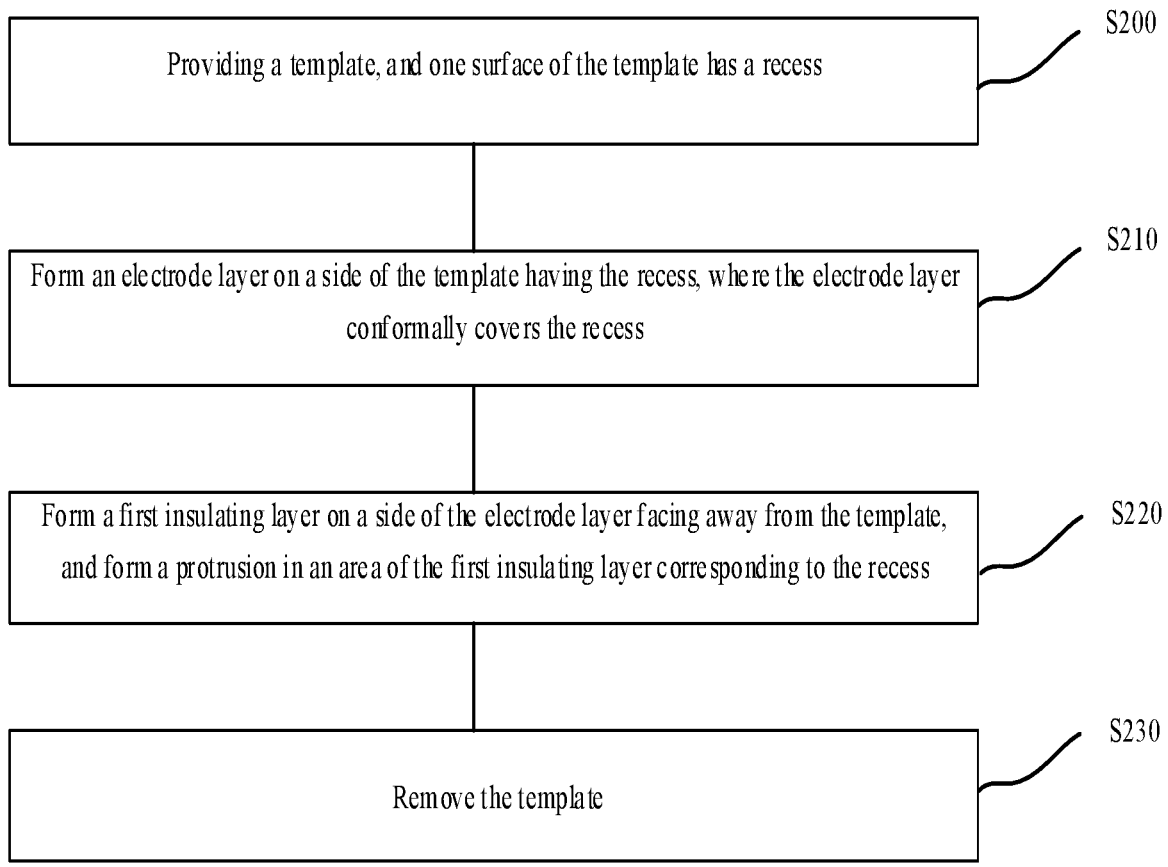
FIG. 9 is another flowchart of a manufacturing method of a microelectrode structure according to an implementation of the present disclosure.

The implementations of the present disclosure also provide a manufacturing method of the microelectrode structure, which is used to produce the above-mentioned microelectrode structure. As shown in FIG. 9, the manufacturing method of the microelectrode structure can include steps S200-S230.

In step S200, a template is provided, and one surface of the template has a recess.

In step S210, an electrode layer is formed on a side of the template having the recess, where the electrode layer conformally covers the recess.

In step S220, a first insulating layer is formed on a side of the electrode layer facing away from the template, and a protrusion is formed in an area of the first insulating layer corresponding to the recess.

In step S230, the template is removed.

The microelectrode structure produced by the manufacturing method of the microelectrode structure in the embodiment of the present disclosure is the same as the microelectrode structure in the above implementations of the microelectrode structure, and therefore, it has the same beneficial effects, which will not be repeated in this disclosure.

The steps of the manufacturing method of the microelectrode structure of the implementations of the present disclosure will be described in detail below.

In step S200, a template is provided, and one surface of the template has a recess.

Figure 10:
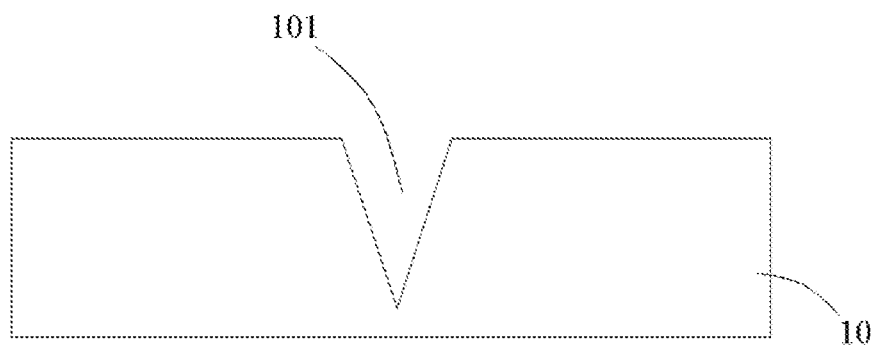
FIG. 10 is a schematic diagram of a template in a manufacturing method of a microelectrode structure according to an implementation of the present disclosure.

As shown in FIG. 10, the material of the template 10 can be silica gel or the like. The angle between the side surface of the recess 101 and the surface of the template 10 can be an obtuse angle, that is, the recess 101 can have a flared structure. Further, the recess 101 can be a conical structure, such as a cone.

In step S210, an electrode layer is formed on a side of the template having the recess, and the electrode layer conformally covers the recess.

Figure 11:
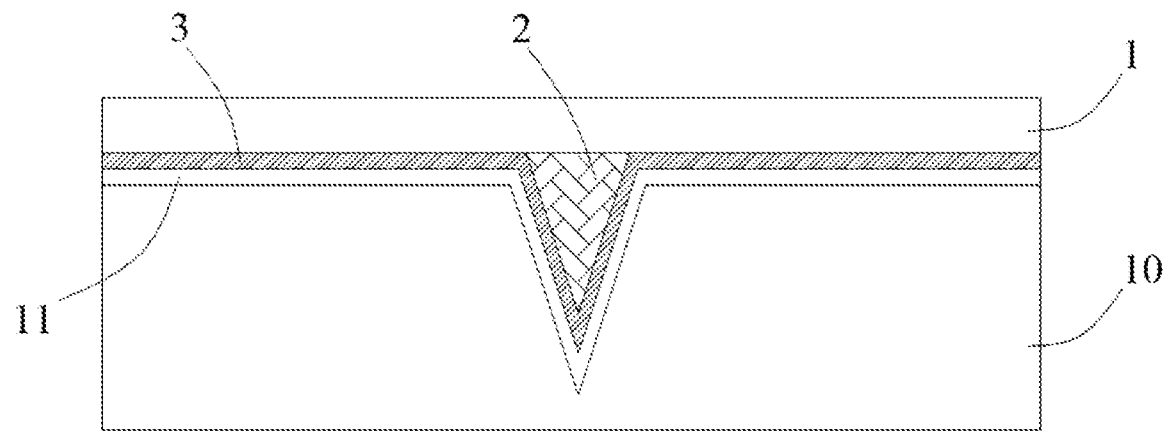
FIG. 11 is a schematic diagram after a first insulating layer is formed in the manufacturing method of the microelectrode structure according to an implementation of the present disclosure.

For example, as shown in FIG. 11, forming the electrode layer 3 can include: forming a sacrifice layer 11 on a side of the template 10 having a recess 101, where the sacrifice layer 11 conformally covers the recess 101; forming an electrode layer 3 on a side of the sacrificial layer 11 facing away from the template 10, where the electrode layer 3 conformally covers an area of the sacrifice layer 11 in the recess 101. The material of the sacrifice layer 11 can be aluminum, but the implementation of the present disclosure does not specifically limit this. The sacrifice layer 11 conformally covers the recess 101, that is, the area of the sacrifice layer 11 corresponding to the recess 101 protrudes toward the recess 101. The electrode layer 3 can be produced by an evaporation process, However, it can also be produced by an inkjet printing process.

Figure 12:
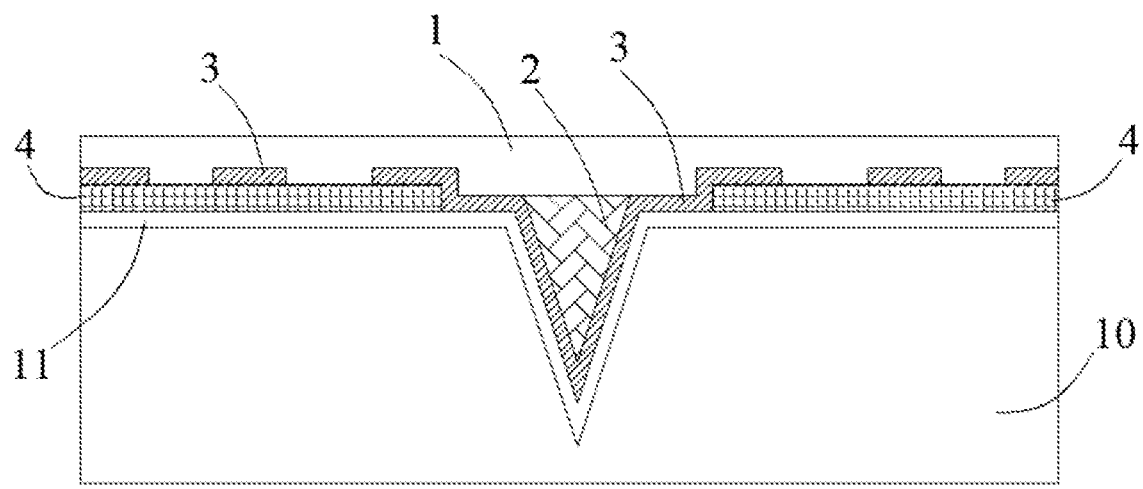
FIG. 12 is another schematic diagram after a first insulating layer is formed in the manufacturing method of the microelectrode structure according to an implementation of the present disclosure.

In another implementation of the present disclosure, as shown in FIG. 12, forming the electrode layer 3 on a side of the template 10 having the recess 101 includes: forming the second insulating layer 4 on a side of the template 10 having the recess 101, where the insulating layer 4 has an opening, and the recess 101 is exposed through the opening; forming an electrode layer 3 covering the second insulating layer 4 and the recess 101. The second insulating layer 4 can be produced by a spin coating process. However, the second insulating layer 4 can also be formed on a side of the sacrificial layer 11 facing away from the template 10.

In step S220, a first insulating layer is formed on a side of the electrode layer facing away from the template, and the first insulating layer forms a protrusion in an area corresponding to the recess.

As shown in FIGS. 11 and 12, the area of the first insulating layer 1 corresponding to the recess 101 forms the protrusion 2, that is, the first insulating layer 1 is non-conformally formed on a side of the electrode layer 3 facing away from the template 10. The first insulating layer 1 can be produced by a spin coating process. The height of the protrusion 2 can be less than or equal to 10 µm.

In step S230, the template is removed.

Taking the sacrifice layer 11 being formed between the electrode layer 3 and the template 10 as an example, removing the template 10 can include: removing the sacrifice layer 11 and the template 10. Specifically, the present disclosure can remove the sacrifice layer 11 through an etching solution. The etching rate of the sacrifice layer 11 by the etching solution is greater than the etching rate of the electrode layer 3 by the etching solution. Taking the material of the electrode layer 3 being Au and the material of the sacrifice layer 11 being Al as an example, the etching solution can include an acid etching solution.

As shown in FIGS. 11 and 4, if the second insulating layer 4 is not formed in the above step S210, after the template 10 is removed, the manufacturing method of the microelectrode structure of the implementation of the present disclosure can further include: forming a second insulating layer 4 on a side of the electrode layer 3 facing away from the first insulating layer 1, where the second insulating layer 4 is provided with an opening, and the protrusion 2 extends out through the opening.

In addition, as shown in FIG. 4, the manufacturing method of the microelectrode structure of the present disclosure can further include: forming a first sensitive functional layer 6, the first sensitive functional layer 6 covering at least an area of the electrode layer 3 corresponding to the protrusion 2. The first sensitive functional layer 6 can be produced by a spin coating process. After forming the first sensitive functional layer 6, the manufacturing method of the microelectrode structure of the present disclosure can further include: forming an auxiliary layer 7, which covers at least an area of the first sensitive functional layer 6 corresponding to the protrusion 2 and is provided with a first through hole for exposing the first sensitive functional layer 6, where a distance between the auxiliary layer 7 and the electrode layer 3 is less than or equal to 100 µm. Taking the material of the auxiliary layer 7 as a metal material as an example, the auxiliary layer 7 can be produced by an evaporation process. After the auxiliary layer 7 is formed, the manufacturing method of the microelectrode structure of the present disclosure can further include: forming a second sensitive functional layer 8, the second sensitive functional layer 8 covering the auxiliary layer 7 and filling the first through hole to be in contact with the sensitive functional layer 6. The second sensitive functional layer 8 can be produced by a spin coating process. In addition, the first through hole on the auxiliary layer 7 is disposed outside the opening of the second insulating layer 4. The structure of forming the first sensitive functional layer 6 on the basis of the structure shown in FIG. 12 is shown in FIG. 13.

The above are only the preferred implementations of the present disclosure, and do not limit the present disclosure in any form. Although the present disclosure has been disclosed as above in preferred implementations, it is not intended to limit the present disclosure. Those skilled in the art, without departing from the scope of the technical solutions of the present disclosure, could use the technical content disclosed above to make equivalent implementations with equivalent changes such as some alterations or modifications. Any simple alterations, equivalent changes and modifications made to the above implementations based on the disclosed technical essence still fall within the scope of the technical solutions of the present disclosure.

What is claimed is:
1. A microelectrode structure, comprising:
   a first insulating layer;
   a first protrusion disposed on the first insulating layer;
   an electrode layer conformally covering the first insulating layer and the first protrusion;
   a first sensitive functional layer at least covering an area of the electrode layer corresponding to an entirety of the first protrusion;
   an auxiliary layer at least covering an area of the first sensitive functional layer corresponding to the entirety of the first protrusion, and provided with a first through hole exposing part of the first sensitive functional layer, wherein a distance between the auxiliary layer and the electrode layer is less than or equal to 100 µm; and
   a second sensitive functional layer covering the auxiliary layer and filling the first through hole in a way that the second sensitive functional layer is in contact with the first sensitive functional layer, and the auxiliary layer is sandwiched between the first sensitive functional layer and the second sensitive functional layer,
   wherein the first protrusion has a tapered structure, and the first through hole is provided in an area of the auxiliary layer corresponding to a top of the first protrusion.
2. The microelectrode structure of claim 1, further comprising:

a second insulating layer disposed on a side of the electrode layer facing away from the first insulating layer, wherein the second insulating layer is provided with an opening, and the first protrusion extends out through the opening.

3. The microelectrode structure of claim 1, wherein a side surface of the first protrusion and a bottom surface of the first protrusion form an acute angle.

4. The microelectrode structure of claim 1, wherein the first protrusion and the first insulating layer are an integral structure.

5. The microelectrode structure of claim 1, wherein the electrode layer comprises a first electrode region.

6. The microelectrode structure of claim 5, wherein the electrode layer further comprises a second electrode region separated from the first electrode region; wherein the microelectrode structure further comprises a second protrusion disposed on the first insulating layer; wherein the first protrusion is in the first electrode region and the second protrusion is in the second electrode region.

7. The microelectrode structure of claim 1, wherein the first insulating layer is provided with a second through hole exposing the electrode layer.

8. A biological chip, comprising the microelectrode structure of claim 1.

9. A biological detection device, comprising the biological chip of claim 8.

10. A manufacturing method of a microelectrode structure, comprising:
 forming a first insulating layer on a supporting plate;
 forming a first protrusion on a side of the first insulating layer away from the supporting plate;
 forming an electrode layer that conformally covers the first insulating layer and the first protrusion;
 forming a first sensitive functional layer, the first sensitive functional layer at least covering an area of the electrode layer corresponding to an entirety of the first protrusion;
 forming an auxiliary layer that at least covers an area of the first sensitive functional layer corresponding to the entirety of the first protrusion, and provided with a first through hole exposing part of the first sensitive functional layer, wherein a distance between the auxiliary layer and the electrode layer is less than or equal to 100 µm;
 forming a second sensitive functional layer, the second sensitive functional layer covering the auxiliary layer and filling the first through hole in a way that the second sensitive functional layer is in contact with the first sensitive functional layer, and the auxiliary layer is sandwiched between the first sensitive functional layer and the second sensitive functional layer; and
 removing the supporting plate,
 wherein the first protrusion has a tapered structure, and the first through hole is provided in an area of the auxiliary layer corresponding to a top of the first protrusion.

11. The manufacturing method of the microelectrode structure of claim 10, wherein directly after forming the electrode layer that conformally covers the first insulating layer and the first protrusion, the manufacturing method of the microelectrode structure further comprises:
 forming a second insulating layer on a side of the electrode layer facing away from the first insulating layer, wherein the second insulating layer is provided with an opening, and the first protrusion extends out through the opening.

12. A manufacturing method of a microelectrode structure, comprising:
 providing a template, a side of the template having a recess;
 forming an electrode layer on the side of the template having the recess, the electrode layer conformally covering the recess;
 forming a first insulating layer on a side of the electrode layer facing away from the template, wherein a part of the first insulating layer corresponding to the recess forms a first protrusion;
 removing the template;
 forming a first sensitive functional layer, the first sensitive functional layer at least covering an area of the electrode layer corresponding to an entirety of the first protrusion;
 forming an auxiliary layer that at least covers an area of the first sensitive functional layer corresponding to the entirety of the first protrusion and is provided with a first through hole exposing part of the first sensitive functional layer, wherein a distance between the auxiliary layer and the electrode layer is less than or equal to 100 µm;
 forming a second sensitive functional layer, the second sensitive functional layer covering the auxiliary layer and filling the first through hole in a way that the second sensitive functional layer is in contact with the first sensitive functional layer, and the auxiliary layer is sandwiched between the first sensitive functional layer and the second sensitive functional layer,
 wherein the first protrusion has a tapered structure, and the first through hole is provided in an area of the auxiliary layer corresponding to a top of the first protrusion.

13. The manufacturing method of the microelectrode structure of claim 12, wherein forming the electrode layer on the side of the template having the recess comprises:
 forming a second insulating layer on the side of the template having the recess, the second insulating layer having an opening, and the recess being exposed through the opening; and
 forming the electrode layer covering the second insulating layer and the recess.

14. The manufacturing method of the microelectrode structure of claim 12, wherein after removing the template, the manufacturing method of the microelectrode structure further comprises:
 forming a second insulating layer on a side of the electrode layer facing away from the first insulating layer, wherein the second insulating layer is provided with an opening, and the first protrusion extends out through the opening.

15. The manufacturing method of the microelectrode structure of claim 12, wherein forming the electrode layer on the side of the template having the recess comprises:
 forming a sacrifice layer on the side of the template having the recess, the sacrifice layer conformally covering the recess; and
 forming the electrode layer on a side of the sacrifice layer facing away from the template, the electrode layer conformally covering an area where the sacrifice layer is disposed in the recess; and
 removing the template comprises:
 removing the sacrifice layer and the template.

16. The manufacturing method of the microelectrode structure of claim 15, wherein removing the sacrifice layer comprises:

removing the sacrifice layer by an etching solution, and an etching rate of the etching solution to the sacrifice layer is larger than an etching rate of the etching solution to the electrode layer.

* * * * *